United States Patent
Zhang

(10) Patent No.: US 11,622,252 B2
(45) Date of Patent: Apr. 4, 2023

(54) METHODS AND SYSTEMS FOR MANAGEMENT AND CONTROL OF COMMUNICATION NETWORK

(71) Applicant: HUAWEI TECHNOLOGIES CO., LTD., Shenzhen (CN)

(72) Inventor: Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/090,817

(22) Filed: Nov. 5, 2020

(65) Prior Publication Data
US 2021/0144530 A1    May 13, 2021

Related U.S. Application Data

(60) Provisional application No. 62/933,082, filed on Nov. 8, 2019.

(51) Int. Cl.
*H04W 4/50*    (2018.01)
*H04W 8/00*    (2009.01)

(52) U.S. Cl.
CPC .............. *H04W 4/50* (2018.02); *H04W 8/00* (2013.01)

(58) Field of Classification Search
CPC .................................. H04W 4/50; H04W 8/00
USPC ...................................................... 455/414.1
See application file for complete search history.

(56) References Cited

U.S. PATENT DOCUMENTS

| | | | |
|---|---|---|---|
| 9,998,286 B1* | 6/2018 | Ramathal | G06F 21/33 |
| 2017/0366357 A1 | 12/2017 | Pattanaik et al. | |
| 2018/0053136 A1 | 2/2018 | Dacosta et al. | |
| 2018/0307859 A1 | 10/2018 | LaFever et al. | |
| 2019/0028249 A1* | 1/2019 | Rost | H04L 5/0037 |
| 2019/0109717 A1 | 4/2019 | Reddy et al. | |

(Continued)

FOREIGN PATENT DOCUMENTS

| CN | 110099114 A | 8/2019 |
|---|---|---|
| CN | 110381153 A | 10/2019 |

(Continued)

OTHER PUBLICATIONS

NGMN Alliance, 5G End-to-End Architecture Framework, V3.0.8, Sep. 13, 2019, 71 pages.

(Continued)

*Primary Examiner* — Joel Ajayi

(57) ABSTRACT

There is provided methods, apparatus and systems for management and control of a communication network. The system includes a plurality of service providers, wherein each of the plurality of service providers belongs to a consortium and all the service providers in the consortium trust each other for actions under a rule corresponding to the consortium, wherein the rule indicates how to manage a record of the actions performed by each of the plurality of service providers. Each of the plurality of service providers is configured to provide a set of services in the communication network, wherein a set of services provided by one service provider in the consortium is in one service type and manage a creation of a record indicative of actions associated with a particular set of services that the service provider provides and a distribution of the record to one or more other service providers in the consortium.

17 Claims, 7 Drawing Sheets

(56) References Cited

U.S. PATENT DOCUMENTS

2019/0301883 A1* 10/2019 Xia ................. H04L 9/3239

FOREIGN PATENT DOCUMENTS

| EP | 3364353 A1 | 8/2018 |
| WO | 2010088428 A1 | 8/2010 |

OTHER PUBLICATIONS

Nour, Boubakr et al., A Blockchain-Based Network Slice Broker for 5G Services, IEEE Networking Letters, vol. 1, No. 3, Sep. 2019, 4 pages.
Rawat, Danda B. et al., Leveraging Distributed Blockchain-based Scheme for Wireless Network Virtualization with Security and QoS Constraints, 2018 International Conference on Computing, Networking and Communications (ICNC), Jun. 21, 2018, 5 pages.
"Electronic Signatures and Infrastructures (ESI); Provision of harmonizedTrust-service status information", ETSI Draft; TS_102231V030102P1, European Telecommunications Standards Institute (ETSI), 650, Route Des Lucioles; F-06921 Sophia-Antipolis; France, No. V3.1.2, Dec. 17, 2009 (Dec. 17, 2009), pp. 1-109, XP014072228,[retrieved on Dec. 17, 2009].

* cited by examiner

METHODS AND SYSTEMS FOR MANAGEMENT AND CONTROL OF COMMUNICATION NETWORK

CROSS-REFERENCE TO RELATED APPLICATIONS

This application claims the benefit and priority from U.S. Provisional Patent Application No. 62/933,082 filed Nov. 8, 2019, the contents of which are incorporated herein by reference in their entirety.

FIELD OF THE DISCLOSURE

The present disclosure pertains to the field of telecommunications and in particular embodiments relate to methods and systems for management and control of wireless communication networks.

BACKGROUND

Currently there are a variety of wireless communication network providers from nationwide carriers to smaller carriers that provide network coverage over selected regions. For a nation wide configuration, the single operator owns and operates the required wireless network equipment for the provisions of these services. For smaller carriers, they can provide native network coverage across selected regions while supplementing nationwide coverage through for example roaming agreements with other carriers.

Network control and management function associated with a wireless communication network are currently controlled and managed by a particular operator. This particular operator has developed its own network includes how this network should be controlled and management.

With the advent of 5G communications system, a more open business environment and eco-system regarding development, deployment, operation and management of a wireless communication networks can be expected. The exclusive control and management of wireless communication networks by operators can be facing large challenges.

Given the prediction of this more open scenario for the telecommunication industry, different players or service providers can provide different types of network control and management services. An issue that arises in this context text is that these different players or service providers may not be mutually trusted. As such the performance provided by the whole system in an open environment is not good and to be improved.

Accordingly, there may be a need for methods and systems for management and control of multi-player wireless communication networks that is not subject to one or more limitations of the prior art.

This background information is intended to provide information that may be of possible relevance to the present disclosure. No admission is necessarily intended, nor should be construed, that any of the preceding information constitutes prior art against the present disclosure.

SUMMARY

It is an object of the present disclosure to obviate or mitigate at least one disadvantage of the prior art.

According to embodiments of the present disclosure there is provided methods and systems for management and control of communication networks.

According to an aspect of the present disclosure, there is provided a system including a plurality of service providers, wherein each of the plurality of service providers belongs to a consortium and all the service providers in the consortium trust each other for actions under a rule corresponding to the consortium, wherein the rule indicates how to manage a record of the actions performed by each of the plurality of service providers. Each of the plurality of service providers is configured to provide a set of services in a communication network, e.g., a wireless communication network, wherein a set of services provided by one service provider in the consortium is in one service type and manage a creation of a record indicative of actions associated with a particular set of services that the service provider provides and a distribution of the record to one or more other service providers in the consortium. A technical solution for this embodiment may be to provide a system that enables the provision of a communication network by a plurality of service providers and ensures a level of trust between the plurality of service providers. Therefore, a good performance may be provided by the system in an open environment in the communication industry.

In some embodiments, the service type is one of a set of defined service types including: configuration related services, monitoring and collection of operational data related services, network operation data sharing related services, and wireless network operation related services. In some embodiments, the configuration related services include one or more of an equipment update and configuration service, an infrastructure network configuration service, a virtual function installation and modification service and a slice instantiation, configuration and modification service. In some embodiments, the monitoring and collection of operational data related services include monitoring and collection of one or more of a performance of equipment service, a performance of infrastructure network service, a performance of virtual function service, a performance of slices service and a performance of end-points service. In some embodiments, the network operation data sharing services include services relating to provide trustable sharing of operational data collected from the communication network. In some embodiments, the wireless network operation related services include services relating to one or more of authentication, authorization and accounting and charging associated with an end-point ID AAA service. In some embodiments, the record indicative of actions associated with a particular set of services includes one or more of: a record indicative of performing one or more service in the set of services, a record indicative of completing one or more service in the set of services, a record indicative of a future action towards one or more service in the set of services, a record indicative of a completed action towards one or more service in the set of services, and a record indicative of an undergoing action towards one or more service in the set of services.

In some embodiments, each of the plurality of service providers is further configured to select a format of the record to be created according to the service type of the particular service associated with the record and create the record according to the selected format. In some embodiments, each of the plurality of service providers is further configured to manage an update of the record by appending a second record to the record so as to achieve an updated record, wherein the second record and the record are indicative of actions associated with the same particular set of services, and a distribution of the updated record to one or more other service providers in the consortium. In some embodiments, each of the plurality of service providers is further configured to obtain validation of the actions prior to the creation of the record.

In some embodiments, obtaining validation further includes negotiation with one or more of the plurality of service providers to obtain a consensus. In some embodiments, the distribution of the record is within a network slice in the communication network, wherein the network slice is dedicated to support one or more of services in the particular set of services. In some embodiments, different service providers in the consortium provides sets of services in different service types. In some embodiments, the set of services in a particular service type are provided by different service providers in the consortium. In some embodiments, management of the record by each of the plurality of service providers is based on a blockchain. In some embodiments, the plurality of service providers are implemented in one or more of network apparatus and network virtual function.

According to another aspect of the present disclosure, there is provided an apparatus including a processor coupled with a memory, wherein one of a plurality of service providers is implemented in the apparatus, wherein each of the plurality of service providers belongs to a consortium and all the service providers in the consortium trust each other for actions under a rule corresponding to the consortium, wherein the rule indicates how to manage a record of the actions performed by each of the plurality of service providers. The apparatus is configured to provide a set of services in the communication network, wherein a set of services provided by one service provider corresponding to the apparatus in the consortium is in one service type and manage a creation of a record indicative of actions associated with a particular set of services that the service provider corresponding to the apparatus provides and a distribution of the record to one or more other service providers in the consortium. A technical solution for this embodiment may be to provide an apparatus that enables the provision of a communication network by a plurality of service providers and ensures a level of trust between the plurality of service providers. A system including one or more of such an apparatus may provide a good performance in an open environment in the communication industry.

According to another aspect of the present disclosure, there is provided a method for communications between a plurality of service providers in a communication network, wherein each of the plurality of service providers belongs to a consortium and all the service providers in the consortium trust each other for actions under a rule corresponding to the consortium, wherein the rule indicates how to manage a record of the actions performed by each of the plurality of service providers. The method incudes providing a set of services in the communication network, wherein a set of services provided by one service provider in the consortium is in one service type and managing a creation of a record indicative of actions associated with a particular set of services that the service provider provides and a distribution of the record to one or more other service providers in the consortium. A technical solution for this embodiment may be to provide a method for the provision of a communication network by a plurality of service providers and ensures a level of trust between the plurality of service providers. The method may lead to a good network performance in an open environment in the communication industry.

Embodiments have been described above in conjunction with aspects of the present disclosure upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

DETAILED DESCRIPTION

Figure 1:
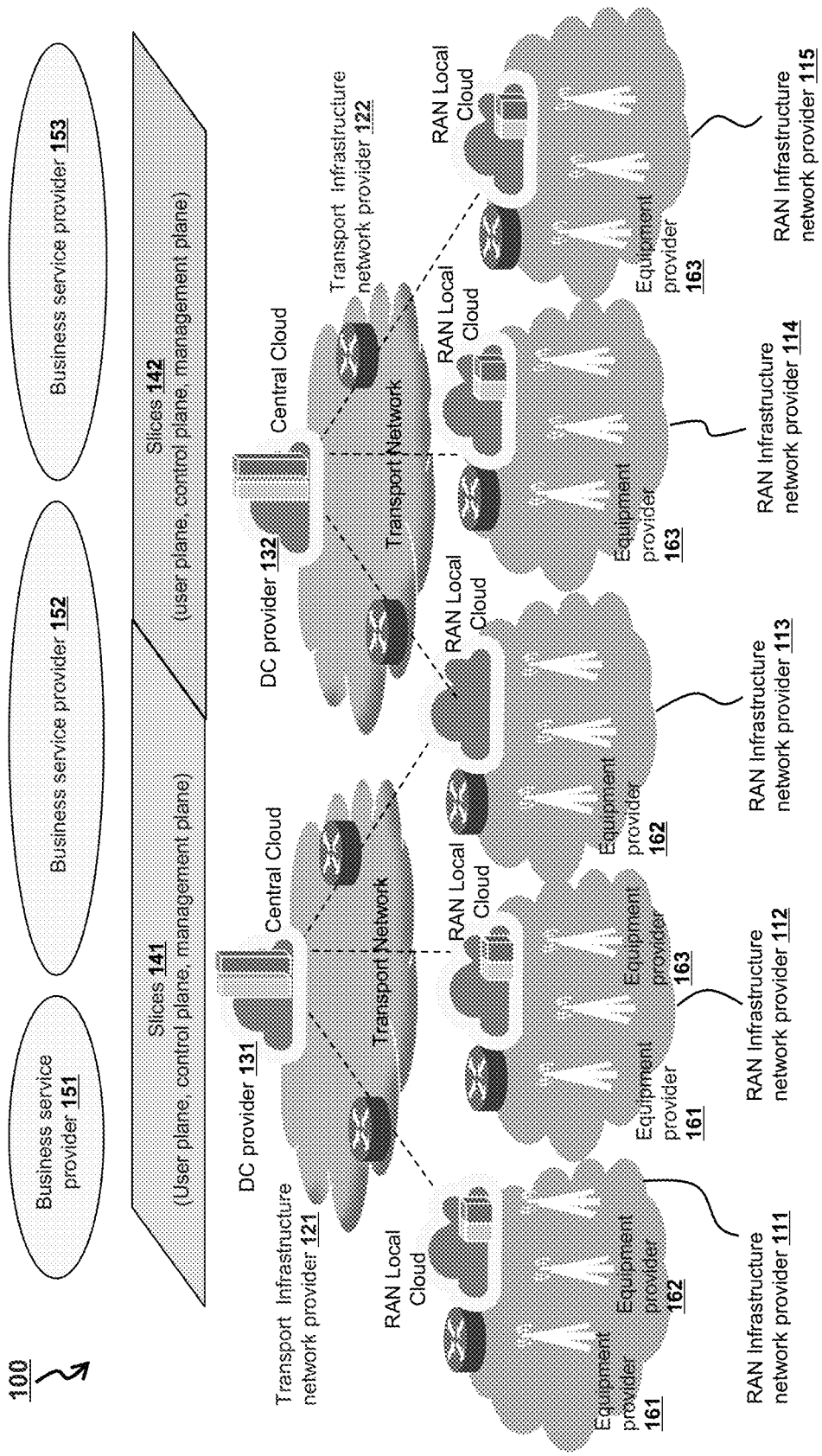
FIG. 1 illustrates a configuration of at least some of the providers or players associated with wireless communication networks in accordance with embodiments.

It has been envisioned that future networks will play a more and more important role in future society and become an attractive industry. A more open business environment and eco-system regarding development, deployment, operation, control and management of wireless network can be expected. A variety of providers in this industry will play different roles. The exclusive control and management of wireless communication networks by operators can be facing large challenges.

The various providers enabling the provision of wireless communication network connectivity can include wireless network equipment providers, infrastructure network providers, virtual function (VF) providers, vertical network slice providers, business service providers and subscribed service providers/servers of business services.

A wireless network equipment provider can provide for example hardware/software equipment, such as network base stations, relays (which can be generalized as Network Nodes), user equipment including handsets and terminals in vehicles, network clouds, for example collection of accessible servers, cables, fibers and the like as would be readily understood by one of ordinary skill in the art. An infrastructure network provider can provide wireless networks using hardware/software equipment provided by (wireless network) equipment providers.

In addition, a virtual function provider can provide virtual function (software) using, for example cloud resources. The virtualization of network functions is considered to be a foundational technology for the architecture of flexible 5G networks. Function virtualization is a technology that allows for the creation of virtual functions on a base of compute, memory (which may include both executable memory and general storage) and connectivity or network resources. In many cases, these resources will exist within a data center.

Virtual slice providers, which may provide for a particular business, can provide business service customised virtual network slice. For example, network slicing is a network architecture that enables the multiplexing of virtualized and independent logical networks on the same physical network infrastructure. Each network slice is an isolated end-to-end network tailored to fulfil diverse requirements requested by a particular application or customer or user. This service-oriented view of the network leverages on the concepts of software defined networks (SDN) and network function virtualization (NFV) that allow for the implementation of flexible and scalable network slices on top of a common network infrastructure. From a business model perspective, each network slice is administrated by a mobile virtual network operator (MVNO). The infrastructure network provider (for example the owner of the telecommunication infrastructure) can lease portions of its physical resources to the MVNOs that share the underlying physical network. According to the availability of the assigned resources, a MVNO can autonomously deploy multiple network slices that are customized to the various applications provided to its own users.

Furthermore, business service providers can provide wireless communication services to their subscribed devices. And the subscribed devices or services, for example end points, of the business services can be considered the service data source or sink, for example the consumers. These subscribed devices can include sensors, actuators, handsets, mobile stations, terminals in vehicles or other configurations of end users.

FIG. 1 illustrates a potential configuration 100 of at least some of the providers or players associated with wireless communication networks. With reference to FIG. 1, at the bottom of the figure, there are the radio access network (RAN) infrastructure network providers (RAN infrastructure network providers 111, RAN infrastructure network providers 112, RAN infrastructure network providers 113, RAN infrastructure network providers 114 and RAN infrastructure network providers 115), which are communicatively coupled to the transport infrastructure network providers 121 and 122 communicatively coupled to the data center providers 131 and 132. With further reference to FIG. 1, business service provider 151 uses slices 141 provided by a slice provider (not shown in FIG. 1), which uses RAN infrastructure network provided by RAN infrastructure network provider 111, RAN infrastructure network provider 112 and RAN infrastructure network provider 113. RAN infrastructure network providers 111, 112 and 113 use equipment from equipment providers 161, 162 and 163 and further use the data center from data center provider 131. On the other hand, business service provider 153 uses slices 142 provided by another slice provider (not shown in FIG. 1), which uses RAN infrastructure network provided by RAN infrastructure network providers 113, 114 and 115. RAN infrastructure network providers 113, 114 and 115 use equipment from equipment providers 162 and 163 and further use the data center from data center provider 132. In case of business service provider 152, business service provider 152 uses either or both of slices 141 and slices 142. In this example of FIG. 1, it is noted that RAN infrastructure network provider 113 provides its services to both transportation infrastructure networks 121 and 122. In contrast, RAN infrastructure network providers 111 and 112 provide their services only to transportation infrastructure networks 121 and RAN infrastructure network providers 114 and 115 provide their services only to transportation infrastructure networks 122.

It is readily apparent from FIG. 1 that there are a plurality of separate services and equipment provided by a collection of different service providers for the provision of wireless communication end-to-end services to a variety of customers. Due to this number of different providers, it is envisioned that these providers will participate in the control, operation and management of the wireless communication networks. For example, equipment providers (e.g. equipment providers 161, 162 and 163 in FIG. 1) are to take care of maintenance, configuration and upgrading of their equipment. Infrastructure network providers (e.g. RAN infrastructure network providers 111, 112, 113, 114, 115 and transport infrastructure network providers 121, 122 in FIG. 1) are to control operation, maintenance and configuration of the infrastructure networks and the like. Virtual function providers are to instantiate and upgrade their software for the provision of the required functionality. Virtual network or slice providers are to develop, deploy, operate and maintain the network slices. Business service providers (e.g. business service providers 151, 152, 153 in FIG. 1) may need to install their service specific virtual functions, for example application servers, in order to control access to the business service and obtain behavior statistics of their subscribers.

It will be readily understood that a service provider as defined herein can be defined as a network entity, network function, apparatus or system which is configured to provide the functions or take the actions as defined for that specific service provider. One of ordinary skill in the art, having regard to the instant application would readily understand suitable configurations of a service provider.

Accordingly, multiple types of interactions or actions among these players or providers are expected in future wireless communication networks. Each type of interaction or action can involve multiple players, either directly or indirectly. As such, one player can participate in multiple types of interactions or actions. It is an assumption that all of the players or providers may not trust one another and as such, bilateral trust agreements may not be possible or feasible as they relate to operation, control and management of these wireless communication networks. As such, in order to enable reliable network operation, control and management, actions by one or more of the players or providers can be authorized by the other players or providers associated with the wireless communication network. In addition, there is a need for each of the players to determine the validity of the operational data that is to be shared between the players or providers associated with the wireless communication network.

According to embodiments, there is provided methods and systems to control/manage interactions or actions of players related to management and control of wireless communication networks. The methods and systems can be provided by forming a confederation of multiple players (CON-NET), defining CON-NET services and utilizing blockchain techniques to validate, authorize and trace all actions of players or participants. The methods are systems provide a decentralised authorization and validation mechanism relating to the control, operation and management of the wireless communication network. The communication between these participants of a CON-NET can be enabled by a network slice to ensure required quality. The decentralization of the authorization and validation can provide a means for each of the multi-players or providers associated with the provision of the services associated with the wireless communication network to receive and disseminate one or more of actions and changes associated therewith.

It will be readily understood that there can be several ways or mechanisms for decentralization of authorization and validation and in some embodiments, the mechanism for decentralization of authorization and validation is operated through the use of blockchains. It will be readily understood that the use of blockchains is being used as an example for the provision of a level of trustworthiness between the service providers, however other mechanisms or manners of developing trustworthiness between service providers can also be used.

It is understood that blockchain at its most basic level, is a chain of blocks, wherein in this context, the digital information (the "block") is stored in a public database (the "chain"). Using a monetary transaction as an example of use of a blockchain, "blocks" on the blockchain are made up of digital pieces of information that have three parts. The first part of the blocks stores information about transactions like the date, time, and dollar amount of your most recent purchase. Second part of the blocks stores information about parties who are participating in each transaction. A block of the purchase would record your "name" along with the seller, however instead of using your actual name, your purchase is recorded without any identifying information using a unique "digital signature," for example a username. And third part of the blocks stores information that distinguishes them from other blocks, for example each block stores a unique code called a "hash" that allows us to tell it apart from every other block.

In addition, when a block stores new data, it is added to the blockchain. The blockchain includes multiple blocks strung together. In order for a block to be added to the blockchain, however, four things must happen. First, a transaction must occur. Second, the transaction must be verified, wherein this verification is performed by a network of computers. As an example, this network can include thousands of computers spread across the globe, wherein this network of computers rushes to check that the transaction happened in the way it was defined, for example, this network of computers confirms the details of the purchase, including the transaction's time, dollar amount, and participants. Third, the transaction must be stored in a block, and after the transaction has been verified as accurate, the transaction's dollar amount, the buyer's digital signature, and seller's digital signature are all stored in a block. Fourth, this block must be given a hash, which is a unique, identifying code. The block is also given the hash of the most recent block added to the blockchain. Once hashing is complete, the hashed block can be added to the blockchain. When that new block is added to the blockchain, it becomes publicly available for anyone to view. In this manner, the transaction is verified by a decentralized mechanism.

The use of a decentralized mechanism for authorization and validation for the joint operation, control and management of the wireless communication network by multiple players can provide a means for fault tolerance, consensus, transparency, traceability and anonymity of network control and management by multiple players.

According to embodiments, for the operation, control and management of actions of players related to the wireless communication network by multiple players, the blockchain framework can include an application layer, a data layer and a network layer. The blockchain framework can provide these multiple players with an established mutually trusted manner for control and management of wireless communication network. The data layer can provide the processing of the data blocks and each data block can include a payload part and a header part. Through the use of this blockchain framework, a particular blockchain can be associate with a particular group of players or providers, wherein each of these players or providers associated with the provision of at least a portion of the wireless communication network, the actions performed by each of these players can be associated with the blockchain for subsequent validation and authorization by the other of these players, thereby maintaining a history of the actions performed by each of the players for the provision of at least a part of the wireless communication network.

According to embodiments, there is provided methods and systems for multiple interested parties, for example providers, to jointly control, operate and manage at least a portion of a wireless communication network. For example, multiple providers can contribute to the provisioning of connectivity services to business customers and end-to-end entities (for example subscribers) of business customers. The present disclosure defines decentralized methods and systems that enable these multiple interested parties to perform as a "confederation" of parties for the provisioning of desired connectivity services, for example wireless communication "networks". According to embodiments, this can be defined as a confederation (CON) for provision of network (NET) services, which can be termed CON-NET. CON-NET can assure that all actions of these players, in terms of wireless communication network control and management, be valid and traceable in order to avoid any indecent actions by a player. In operation of CON-NET, signalling and data exchange between these players is provided. As such in some embodiments, a dedicated set of resources can be allocated for the operation of CON-NET, namely communication between the players.

According to embodiments, CON-NET can define CON-NET services of network control, operation and management, wherein each such a service is called a CON-NET service and is assigned a CON-NET service ID. According to embodiments, CON-NET can define a CON-NET group which is associated with a group of players and a group of CON-NET services which can be assigned a corresponding CON-NET ID. According to embodiments, a player, for example a provider associated with the provision of the connectivity services, can participate one or more CON-NET groups. According to embodiments, in order for a player to be a participant in a particular CON-NET group, negotiation with and approval by a consensus of CON-NET group members can be required. Enabling the methods and systems is the configuration of the wireless communication networks using network slicing and a decentralised authorization and validation mechanism relating to the control, operation and management of the wireless communication network. It will be readily understood that there can be several ways or mechanisms for decentralization of authorization and validation and in some embodiments, the mechanism for decentralization of authorization and validation is operated through the use of blockchains.

According to embodiments, different types of CON-NET services may necessitate different types of customization of blockchain processes, for the decentralization of authorization and validation of actions performed with respect to that particular CON-NET service. It is understood that there can be multiple types of CON-NET services wherein each CON-NET service can be associated with a different type of service, for example configuration related services, monitoring and collection of operational data related services, network operation data sharing services and wireless network operation related services.

According to embodiments, configuration related services can relate to actions associated with validation and authorization of changes to services. As examples, these configuration related services can include equipment software updating and configuration services, infrastructure network configuration services, virtual function (for example software) installation and modification services, network slice instantiation, configuration and modification services. Other configuration related services associated with a wireless communication network would be readily understood by a worker skilled in the art.

According to embodiments, monitoring and collection of operational data related services can include services relating to monitoring and collecting data indicative of performance of equipment services, performance of infrastructure network, utilization efficiency services, performance of virtual functions and usage of infrastructure resources services, performance of slices and usage of infrastructure resources services, performance of business services and usage of slice and/or infrastructure resource, traffic load statistics services, performance of end-points (for example, devices, application servers and the like), resource usage, traffic pattern statistics and behavior record services. Other monitoring and collection of operational data related services associated with a wireless communication network would be readily understood by a worker skilled in the art.

According to embodiments, network operation data sharing services can include services relating to data sharing services to provide trustable sharing of a variety of collected network operational data among interested parties, for example among different vendors, infrastructure network providers, business service providers and the like. Other network operation data sharing services associated with a wireless communication network would be readily understood by a worker skilled in the art.

According to embodiments, wireless network operation related services can include services relating to services for end-point ID AAA service associated with for example, infrastructure network providers, slice providers, business service providers and the like. It is understood that end-point ID AAA relates to for example end-point ID management (authentication, authorization and accounting or charging). Wireless network operation related services can also include charging instalment services, for example relating to multi-level charging instalments for end-points, business service providers, slice providers, infrastructure network providers. Other wireless network operation related services associated with a wireless communication network would be readily understood by a worker skilled in the art.

According to embodiments, a CON-NET group can be associated with a group of one or more players, wherein for example a player is a provider associated with the provision of the connectivity services, and a group of one or more CON-NET services. As such, a CON-NET group can be associated with one or more players and one or more CON-NET services. According to embodiments, in order for a player to be a participant in a particular CON-NET group, negotiation with and approval by a consensus of CON-NET group members may be required. According to embodiments, this negotiation and approval process associated with a CON-NET group can be associated with pre-action approval, action being performed and a post action record.

According to embodiments, a CON-NET group defines the rules and interaction between the service providers associated with that particular CON-NET group. For example, is can define the rules by which these service providers communicate. According to embodiments, the rules and interaction between the service providers of a CON-NET group can be provided by the implementation of a slice or network slice. According to embodiments, the data that is transmitted between the service providers or players or the interfaces associated therewith, of a CON-NET group can be communicated in data blocks. These data blocks can be design or configuration of the format of the data blocks can depend on the type of service associated with the data block.

According to embodiments, due to the variety of network control and management services that are provided and that the same types of services can be provided by different players or service providers, for example due to geographical domains associated with the service providers, multiple level CON-NET groups can be configured.

Figure 2:
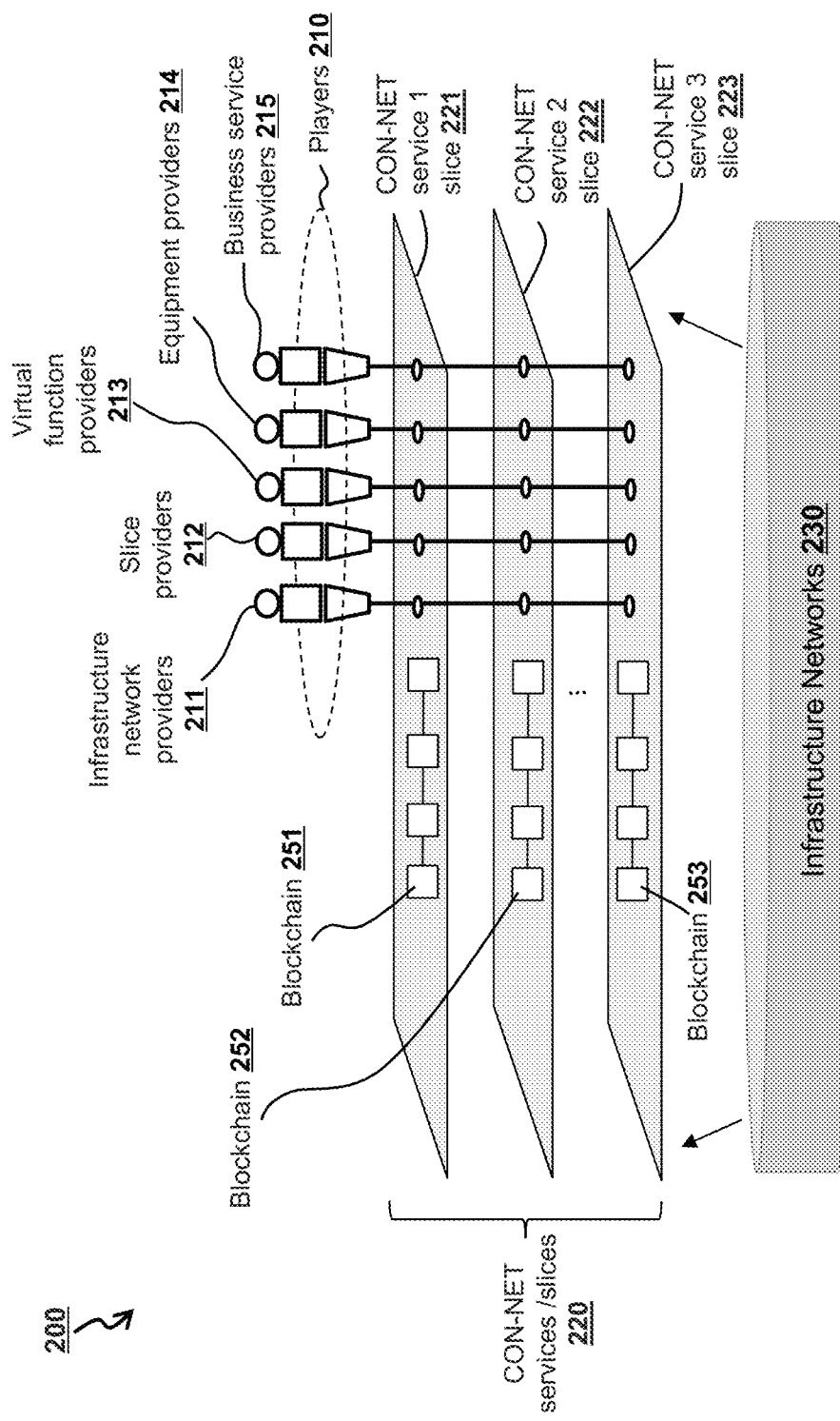
FIG. 2 illustrates a CON-NET group configured as plural players associated with a particular CON-NET service assigned to a particular network slice, in accordance with embodiments.

According to some embodiments, a CON-NET group can be configured as plural players associated with a particular CON-NET service assigned to a particular network slice. In this embodiment, each CON-NET service can be configured and associated with its own network slice. In this configuration, CON-NET service slice has associated therewith a blockchain which provides a means for the participants associated with that service slice to mutually provide control, operation and management thereof. This configuration is illustrated as configuration 200 in FIG. 2, wherein multiple CON-NET service slices (e.g. CON-NET service 1 slice 221, CON-NET service 2 slice 222, CON-NET service i slice 223, collectively CON-NET service slices 220) are deployed on top of the infrastructure networks 230, such that each of the CON-NET service slices 221, 222 and 223 provides connectivity between the players associated therewith. In this example, the participants or players or providers 210 can include infrastructure network providers 211, slice providers 212, virtual function providers 213, equipment providers 214 and business service providers 215. It would be readily understood that other providers of one or more features associated with a wireless communication network can also be included as a participant or player or provider. For each of the CON-NET services, one blockchain (e.g. blockchain 251, blockchain 252 or blockchain 253) is maintained and the multiple players 210 participate in actions related to the operation of that blockchain, thereby providing each of the players 210 with the ability to control, operate and manage the portion of the communication network as a collective.

Figure 3:
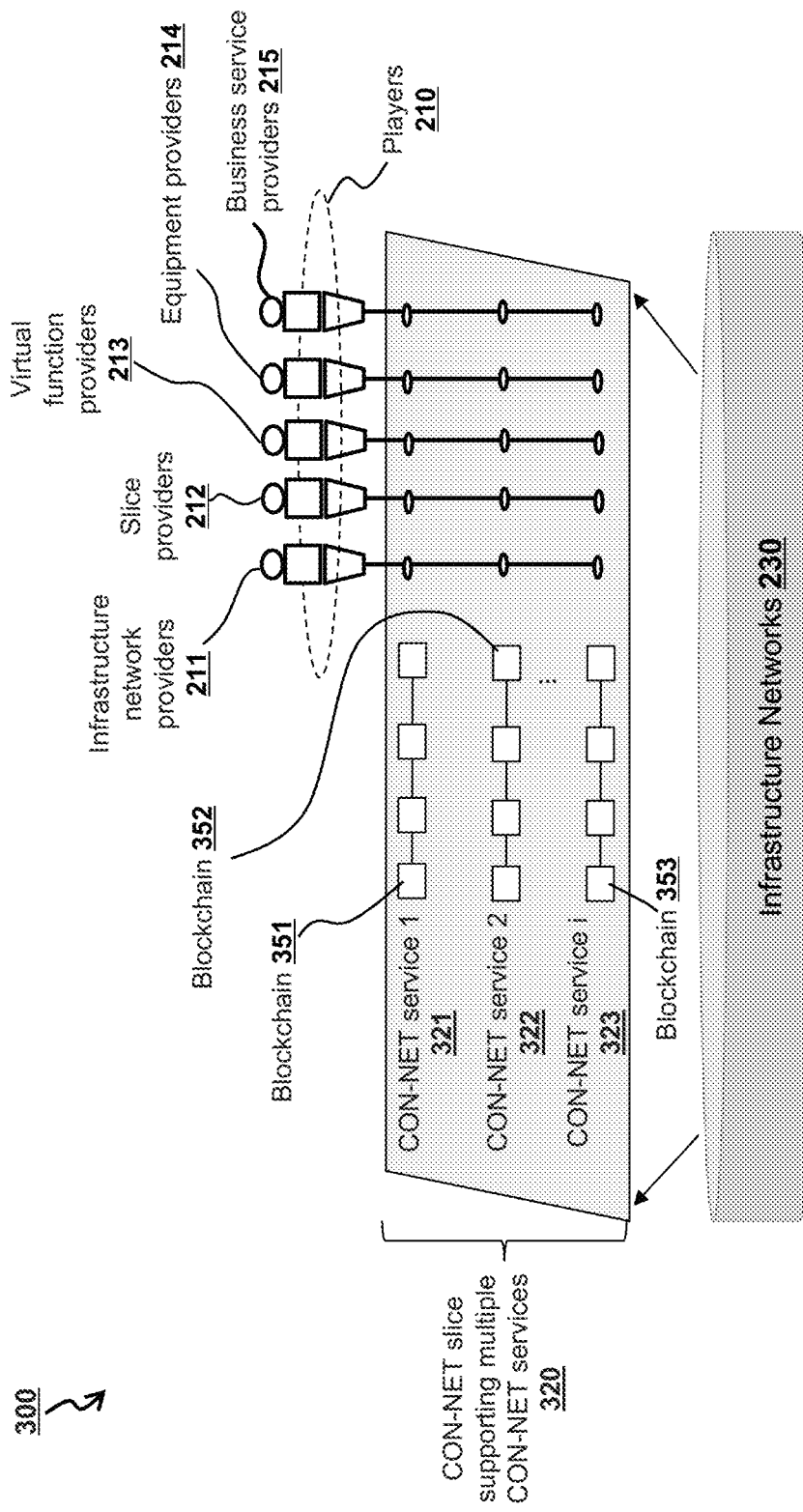
FIG. 3 illustrates a CON-NET group configured as plural players associated with multiple CON-NET services that are assigned to a particular network slice, in accordance with embodiments.

According to some embodiments, a CON-NET group can be configured as plural players associated with multiple CON-NET services that are assigned to a particular network slice. This configuration is illustrated as configuration 300 in FIG. 3, wherein a single CON-NET slice is deployed on top of the infrastructure networks 230, such that the CON-NET slice 320 provides connectivity between the players 210 associated with the plural CON-NET services (e.g. CON-NET service 321, CON-NET service 322, CON-NET service 323). In this example, the participants or players or providers 210 can include infrastructure network providers 211, slice providers 212, virtual function providers 213, equipment providers 214 and business service providers 215. It would be readily understood that other providers of one or more features associated with a wireless communication network can also be included as a participant or player or provider. In this embodiment, a blockchain is associated with each of the CON-NET services 321, 322 and 323. For each of the CON-NET services 321, 322 and 323, one blockchain (e.g. blockchain 351, blockchain 352 or blockchain 353) is maintained and the multiple players 210 participate in actions related to the operation of that blockchain, thereby providing each of the players 210 with the ability to control, operate and manage the portion of the communication network as a collective. Each of the players 210 can be associated with more than one blockchain. Each of the CON-NET services 321, 322 and 323 can be assigned a CON-NET service identifier (CON-NET SID) in order that each of these CON-NET services 321, 322 and 323 can be distinguished from each other as they are each using the same network slice. In some embodiments, for communication within the network slice, the CON-NET SID can be inserted into a packet header following the packet routing information header, for example IP header. In some embodiments, the blockchain 351, 352 or 353 can be modified in order that the CON-NET SID is carried thereby. For example, the header of the data block associated with the blockchain 351, 352 or 353 can be configured to include the CON-NET SID.

Figure 4:
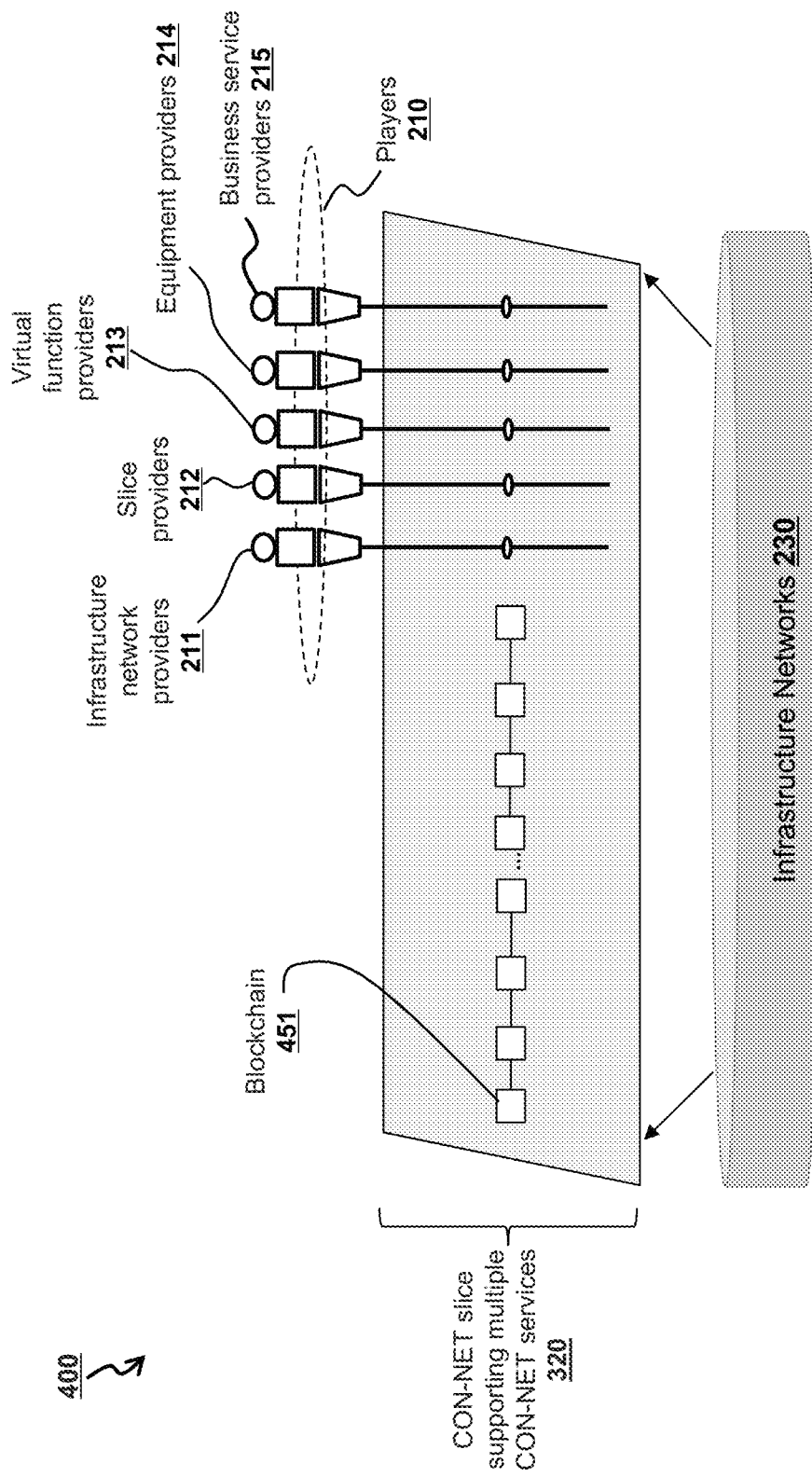
FIG. 4 illustrates a CON-NET group configured as plural players associated with multiple CON-NET services that are assigned to a particular network slice, wherein a single blockchain is associated with all of the CON-NET services, in accordance with embodiments.

According to some embodiments, a CON-NET group can be configured as plural players associated with multiple CON-NET services that are assigned to a particular network slice, wherein a single blockchain (e.g. blockchain 451 in FIG. 4) is associated with all of the CON-NET services. This configuration is illustrated as configuration 400 in FIG. 4, wherein a single CON-NET slice is deployed on top of the infrastructure networks 230, such that the CON-NET slice 320 provides connectivity between the players 210 associated with the plural CON-NET services. In this example, the participants or players or providers 210 can include infrastructure network providers 211, slice providers 212, virtual function providers 213, equipment providers 214 and business service providers 215. It would be readily understood that other providers of one or more features associated with a wireless communication network can also be included as a participant or player or provider. In this embodiment, a single blockchain 451 is associated with all of the CON-NET services, wherein the blockchain 451 is maintained and the multiple players 210 participate in actions related to the operation of that blockchain 451, thereby providing each of the players 210 with the ability to control, operate and manage the portion of the communication network as a collective. Each of the CON-NET services can be assigned a CON-NET service identifier (CON-NET SID) in order that each of these CON-NET services can be distinguished from each other as they are each using the same network slice and also only associated with a single blockchain 451. In some embodiments, the blockchain 451 can be modified in order that the CON-NET SID is carried thereby. For example, the header of the data block associated with the blockchain 451 can be configured to include the CON-NET SID.

According to some embodiments, the use of a network slice for the provision of functionality for communication within a CON-NET group can provide a desired level of quality of service (QoS) for the CON-NET group. However, it would be understood that a CON-NET group can be provided with the functionality thereof without a dedicated network slice.

Figure 5:
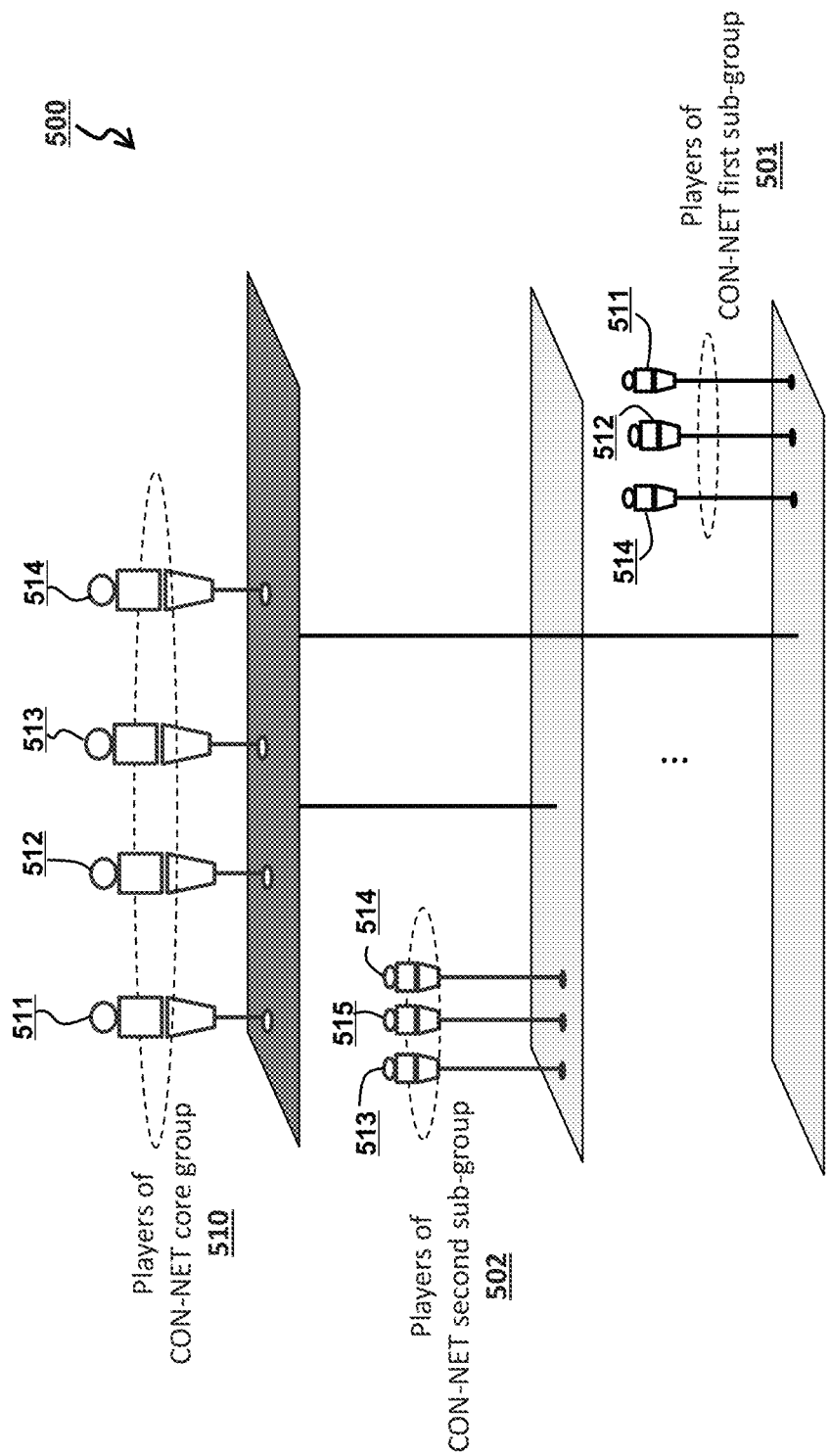
FIG. 5 illustrates a CON-NET group defined using a multilayer configuration in accordance with embodiments.

According to some embodiments, a CON-NET group can be defined using a multilayer configuration such as the multilayer configuration 500 in FIG. 5. The CON-NET group can include plural players, wherein one or more of these players may be assigned to a CON-NET core group, which can be provided with overall management of the CON-NET group. One or more of the CON-NET players can be assigned to a CON-NET sub-group, wherein there are one or more sub-groups. Each of the CON-NET sub-groups can be assigned to manage a sub-set of the CON-NET services associated with the provision of at least some wireless communication network functionality. An example of a multi-layer CON-NET group 510 is illustrated in FIG. 5. As illustrated, there are a total of five players (511, 512, 513, 514 and 515) associated with the CON-NET group. Of these five players, four thereof (players 511, 512, 513 and 514) are assigned to the CON-NET core group 510. A first sub-group 501 is managed by the CON-NET core group 510, wherein this first sub-group 501 provides a first set of CON-NET services. This first sub-group 501 includes players 514, 512 and 511. A second sub-group 502 is also managed by the CON-NET core group 510, wherein this second sub-group 502 provides a second set of CON-NET services. This second sub-group 502 includes players 513, 515 and 514. As illustrated in FIG. 5, the sub-groups can include players associated with the CON-NET core group (e.g. players 511, 512, 513 and 514), however a player does not have to be included within the CON-NET core group (e.g. CON-NET core group 510) in order to be associated with a CON-NET sub-group, for example the second sub-group 502 includes player 515 which is not present in the core group 510. Further as illustrated in FIG. 5, a player can be associated with one or more sub-groups, for example player 514 is associated with both sub-group 501 and sub-group 502.

As previously discussed, a blockchain at its most basic level, is a chain of blocks, wherein in this context, the digital information (the "block") is stored in a public database (the "chain"). In the context of the use of blockchain for the provision of CON-NET, "blocks" on the blockchain are made up of digital pieces of information that have three parts. The first part of the blocks stores information about actions performed like the date, time, and type of action taken. Second part of the blocks stores information about parties who are participating in each action, for example which participants, players or providers are participating in action being performed. A third part of the block stores information that distinguishes the block from other blocks, for example each block stores a unique code called a "hash" that allows for the participants to tell that block apart from every other block.

Furthermore, as previously noted, different types of CON-NET services may necessitate different types of customization of blockchain processes, for the decentralization of authorization and validation of actions performed with respect to that particular CON-NET service. There can be multiple types of CON-NET services wherein each CON-NET service can be associated with a different type of service, for example configuration related services, monitoring and collection of operational data related services, network operation data sharing services and wireless network operation related services.

According to some embodiments, the CON-NET service is associated with configuration related services. For example, configuration related services may require the downloading of certain software, for example virtual function instantiation, device updating or other services that may necessitate the download of software. In these embodiments, actions that may need to be controlled include initial software download, download of updates of software, removal of software and the like. In order to include the identification of these types of actions within a blockchain, the block can include a hash of the software, wherein data record (transactions) of the block can include the software name, version numbers and the like, which may provide for the identification of the actions performed in relation to the software associated with the configuration related services. In some embodiments, the CON-NET SID can be included in the data block header associated with the block of the blockchain.

According to some embodiments, the CON-NET service is associated with monitoring and collection of operational data related services. For some services, some data, i.e., operation data, needs to be obtained from equipment hardware and/or software. For such services, actions can include data monitor and data collection by request from one or more providers, permission of operation data access by request from one or more providers, and acquisition of raw or statistic operation data by request from one or more providers. In order to include the identification of these types of actions within a blockchain, the block can include a hash of the calculation of operational data after de-privacy, wherein data record (transactions) of the block can include the name, version numbers and hash of the operational data. In some embodiments, an identification of the source equipment from which the operational data is received and an identification of the destination equipment. In some embodiments, the CON-NET SID can be included in the data block header associated with the block of the blockchain.

According to some embodiments, the CON-NET service is associated with network operation data sharing services. For some services, some statistical data of operation needs to be shared among the players, participants, providers. For such services, actions can include announcement of availability of certain types of statistical data, sharing request, permission of statistical data access, acquisition of statistical data and the like. In order to include the identification of these types of actions within a blockchain, the block can include a hash of the calculation of statistical data, wherein data record (transactions) of the block can include the name, version numbers and hash of the statistical data. In some embodiments, the CON-NET SID can be included in the data block header associated with the block of the blockchain.

According to some embodiments, there is a cost associated with one or more actions performed by one or more of the players, participants, providers associated with the provision of at least a portion of the wireless communication network. For some of the services provided by one or more players, participants, providers a record or log can be maintained for business purposes, which may include charging others of the group of players, participants, providers or users of the wireless communication network for actions performed.

Having regard to charging related services, the following outlines an example. For the purpose of receiving payment, an infrastructure network provider (e.g. infrastructure network provider 211) can monitor or log one or more of a variety of information regarding network traffic. For example, an infrastructure network provider can monitor or log traffic throughput of each of the individual subscribers associated with a business service provider (e.g. business service provider 215). An infrastructure network provider can monitor or log integrated traffic/signaling message throughput of a business customer. An infrastructure network provider may monitor or log traffic/signaling message throughput of a network slice provider (e.g. slice provider 212). A network slice provider can monitor/log traffic throughput of each of the individual subscribers of a business service provider, or integrated traffic/signaling message throughput of a business customer. A business service provider may be interested in information indicative of the usage of application services by its subscribers and the like. The business service provider may perform certain monitoring/logging for each of its subscribers, regarding, a variety of actions performed thereby on, for example number of application accesses. Taking the above monitoring of communication network usage, for charging purposes, providers/players need to provide a valid record summary, which may not be specific usage log details, to a charging service associated with the blockchain. Such a charging action can be recorded in the blockchain for distribution to the other providers/players. In supporting this charging service, a charging entity performs the record analytics and decides charging payment based on principles agreed by all players that participate in the CON-NET charging service. The action of payment settlement may also be recorded by the charging service blockchain.

For example, player A requests payment from one or more other players on its private record (for example actions performed for the "confederation" for provision of at least part of the wireless communication network) and the identification of payment settlement. In order to include the identification of these types of actions within a blockchain, the block can include a hash of the private record, wherein data record (transactions) of the block can include the name, version numbers and hash of the record. In some embodiments, the CON-NET SID can be included in the data block header associated with the block of the blockchain.

According to embodiments, by applying the methods and systems of the instant disclosure, joint and de-centralized control, operation and management by multiple un-trusted players can become possible. These methods and systems may be expected to play an important role in future wireless communication networks, since openness in network control and management by multiple players is becoming an unavoidable trend.

According to some embodiments, the CON-NET service is associated with configuration related services. In some cases, configuration related services may require downloading of certain software. For example, virtual function instantiation, device updating or other services may necessitate the download of software. As an example of the CON-NET service the following discussion of potential operation is discussed below.

In this example, a CON-NET group is created among N players based on, e.g., negotiation and/or consensus. These N players includes two equipment providers—Equip_A and Equip_B, and an infrastructure network provider—Inf_A, a slice provider—Slice_A, and two business service providers—Bus_A and Bus_B. The CONE-NET group defines a CON-NET service associated with configuration related services and specifically the service can be software upgrade of equipment. The CON-NET group jointly determines that Bus-A and Bus_B, Slice A and Inf_A are within the CON_NET core group to verify the actions and perform consensus for this service. All of these players have obtained their key materials, for example a public key and private key in order that they can have access to the blockchain formed in association with the service. In this example the CON-NET group may perform the following actions as they relate to actions performed and added to the blockchain associated therewith.

The first data block of the blockchain can be optionally defined by the core group. The first data block of the blockchain may include information relating to versions of information and time when the block is created and so on without a specific transaction record as this is initial setup.

At a point of time, equipment provider Equip_A needs to upgrade software of one piece of its equipment, e.g. equipment AAA. Equip_A generates a transaction record which includes information required for the action (in this case software upgrade), such as software version number, equipment AAA name, time to upgrade the software, the hash of the software, etc., and sends to one or more of the players in the core group after signing the transaction record. It is assumed that after verification and consensus operation performance by the players of the core group, a consensus has been reached. For example, Equip_A can download its software to its equipment AAA. At the same time, Equip_A can create, by itself or via a trusted agent, a data block for inclusion in the blockchain. The data block payload captures the authorized transaction record with a digital signature; the data block header may capture the version number, time stamp, hash or previous block, the name of Equip_A (or an identifier for example its public key) or the like. The data block upon integration into the blockchain is then sent to the some or all of the players of the CON-NET group, which can depend on the configuration of rules by that CON-NET group. The transaction record, namely what the Equip_A had done is now become available at all or some other players. If Equip_B now plans to upgrade software of its equipment, e.g. equipment BBB, Equip_B repeats the above process and thus appends a further block onto the blockchain.

The chain of this service keeps information on all actions by equipment providers Equip_A and Equip_B regarding their software upgrade actions. This information can be open to all players in case they want to trace the actions performed. The blockchain of this service keeps information regarding all actions by equipment providers Equip_A and Equip_B, regarding their software upgrade actions. This information is then open to all players in case they want to trace the actions taken by the players associated with the provision of this at least portion of the wireless communication network.

It is understood, that for an extreme case is that there is only one player in the CON-NET core group of a CON-NET group and this can be considered to be a centralized solution for control, operation and management of the wireless communication network. It would be readily understood that the level of decentralization of the control, operation and management of the wireless communication network can be at least in part determined by the number of players in the CON-NET core group.

Figure 6:
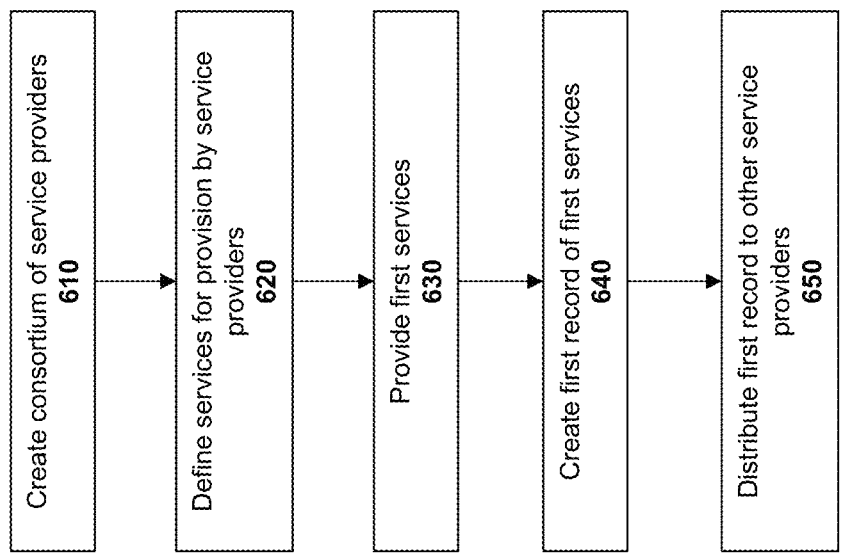
FIG. 6 illustrates a method for provision of wireless communication network by a plurality of service providers in accordance with embodiments.

FIG. 6 illustrates a method for provision of wireless communication network by a plurality of service providers in accordance with embodiments. The method includes creating 610 a consortium representative of the plurality of service providers and defining 620, for one or more of the plurality of services providers, one or more services for provision by each of the one or more of the plurality of service providers. The method further includes providing 630, by a first service provider, a first set of services for provision of the wireless communication network and creating 640, by the first service provider, a first record indicative of actions associated with the first set of services. In addition, the method includes distributing 650, by the first service provider, the first record to others of the plurality of service providers.

A system according to embodiments includes a plurality of service providers, wherein each of the plurality of service providers belongs to a consortium and all the service providers in the consortium trust each other for actions under a rule corresponding to the consortium, wherein the rule indicates how to manage a record of the actions performed by each of the plurality of service providers. Each of the plurality of service providers is configured to provide a set of services in the communication network, wherein a set of services provided by one service provider in the consortium is in one service type and manage a creation of a record indicative of actions associated with a particular set of services that the service provider provides and a distribution of the record to one or more other service providers in the consortium. A technical solution for this embodiment may be to provide a system that enables the provision of a communication network by a plurality of service providers and ensures a level of trust between the plurality of service providers. Therefore, a good performance may be provided by the system in an open environment in the communication industry.

In some embodiments, the service type is one of a set of defined service types including: configuration related services, monitoring and collection of operational data related services, network operation data sharing related services, and wireless network operation related services. In some embodiments, the configuration related services include one or more of an equipment update and configuration service, an infrastructure network configuration service, a virtual function installation and modification service and a slice instantiation, configuration and modification service. In some embodiments, the monitoring and collection of operational data related services include monitoring and collection of one or more of a performance of equipment service, a performance of infrastructure network service, a performance of virtual function service, a performance of slices service and a performance of end-points service. In some embodiments, the network operation data sharing services include services relating to provide trustable sharing of operational data collected from the communication network. In some embodiments, the wireless network operation related services include services relating to one or more of authentication, authorization and accounting and charging associated with an end-point ID AAA service. In some embodiments, the record indicative of actions associated with a particular set of services includes one or more of: a record indicative of performing one or more service in the set of services, a record indicative of completing one or more service in the set of services, a record indicative of a future action towards one or more service in the set of services, a record indicative of a completed action towards one or more service in the set of services, and a record indicative of an undergoing action towards one or more service in the set of services.

In some embodiments, each of the plurality of service providers is further configured to select a format of the record to be created according to the service type of the particular service associated with the record and create the record according to the selected format. In some embodiments, each of the plurality of service providers is further configured to manage an update of the record by appending a second record to the record so as to achieve an updated record, wherein the second record and the record are indicative of actions associated with the same particular set of services, and a distribution of the updated record to one or more other service providers in the consortium. In some embodiments, each of the plurality of service providers is further configured to obtain validation of the actions prior to the creation of the record.

In some embodiments, obtaining validation further includes negotiation with one or more of the plurality of service providers to obtain a consensus. In some embodiments, the distribution of the record is within a network slice in the communication network, wherein the network slice is dedicated to support one or more of services in the particular set of services. In some embodiments, different service providers in the consortium provides sets of services in different service types. In some embodiments, the set of services in a particular service type are provided by different service providers in the consortium. In some embodiments, management of the record by each of the plurality of service providers is based on a blockchain. In some embodiments, the plurality of service providers is implemented in one or more of network apparatus and network virtual function.

An apparatus according to embodiments includes a processor coupled with a memory, wherein one of a plurality of service providers is implemented in the apparatus, wherein each of the plurality of service providers belongs to a consortium and all the service providers in the consortium trust each other for actions under a rule corresponding to the consortium, wherein the rule indicates how to manage a record of the actions performed by each of the plurality of service providers. The apparatus is configured to provide a set of services in the communication network, wherein a set of services provided by one service provider corresponding to the apparatus in the consortium is in one service type and manage a creation of a record indicative of actions associated with a particular set of services that the service provider corresponding to the apparatus provides and a distribution of the record to one or more other service providers in the consortium. A system including one or more of such an apparatus may provide a good performance in an open environment in the communication industry.

According to embodiments, a method for communications between a plurality of service providers in a communication network is provided. Each of the plurality of service providers belongs to a consortium and all the service providers in the consortium trust each other for actions under a rule corresponding to the consortium, wherein the rule indicates how to manage a record of the actions performed by each of the plurality of service providers. The method incudes providing a set of services in the communication network, wherein a set of services provided by one service provider in the consortium is in one service type and managing a creation of a record indicative of actions associated with a particular set of services that the service provider provides and a distribution of the record to one or more other service providers in the consortium. The method may lead to a good network performance in an open environment in the communication industry.

It will be readily understood that while the instant disclosure has been referring to the terms including "block" and "blockchain", these terms are to be considered as non-limiting with respect to the scope thereof. For example, a block can also be termed a "record" and a blockchain can be termed a "service record". According to aspects of the present disclosure, a service provider provides services and creates a record or block that is indicative of the services provided, wherein this record or block can be formed into a service record or blockchain that can be distributed to the other services providers associated with the consortium of services providers. This service record or blockchain provides a means for notification of actions or tasks to be performed, completed or to be performed. In this manner the service record or blockchain provides for the development of the consortium of service providers that can be configured as a distributed trust authority.

Figure 7:
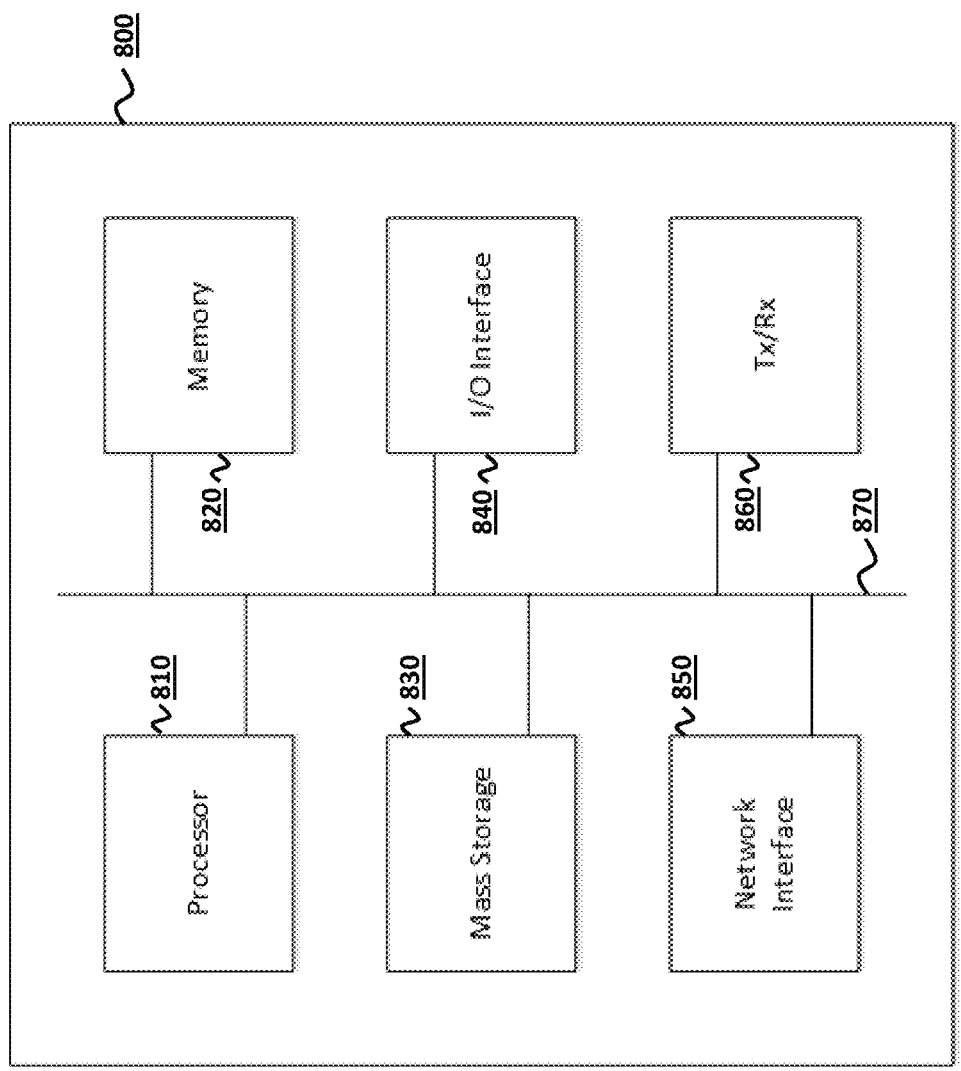
FIG. 7 is a schematic diagram of an electronic device according to embodiments.

FIG. 7 is a schematic diagram of an electronic device 800 that may perform any or all of the steps of the above methods and features described herein, according to different embodiments. For example, a base station, eNB, gNB or NB or network node may be configured as an electronic device 800. Furthermore, a service provider can be configured as an electronic device or multiple interconnected electronic devices. It will be readily understood that multiple electronic devices may be configured to perform any or all of the above methods. For example, electronic device 800 may be a satellite or a vehicle and services associated with the electronic device 800 include services associated with satellite communication or Internet of Vehicle (IoV).

As shown, the electronic device includes a processor 810, memory 820, non-transitory mass storage 830, I/O interface 840, network interface 850, and a transceiver 860, all of which are communicatively coupled via bi-directional bus 870. According to certain embodiments, any or all of the depicted elements may be utilized, or only a subset of the elements. Further, the electronic device 800 may contain multiple instances of certain elements, such as multiple processors, memories, or transceivers. Also, elements of the hardware device may be directly coupled to other elements without the bi-directional bus.

The memory 820 may include any type of non-transitory memory such as static random access memory (SRAM), dynamic random access memory (DRAM), synchronous DRAM (SDRAM), read-only memory (ROM), any combination of such, or the like. The mass storage element 830 may include any type of non-transitory storage device, such as a solid state drive, hard disk drive, a magnetic disk drive, an optical disk drive, USB drive, or any computer program product configured to store data and machine executable program code. According to certain embodiments, the memory 820 or mass storage 830 may have recorded thereon statements and instructions executable by the processor 810 for performing any of the aforementioned method steps described above.

According to an aspect of the present disclosure, there is provided a method for provision of a wireless communication network by a plurality of service providers. The method includes providing, by a first service provider, first services for provision of the wireless communication network and creating, by the first service provider, a first data block indicative of the first services. The method further includes distributing, by the first service provider, the first data block to others of the plurality of service providers.

In some embodiments of the present disclosure, the method further includes providing, by a second service provider, additional first services for provision of the wireless communication network and creating, by the second service provider, a second data block indicative of the additional first services. The method further includes appending, by the second service provider, the second block to the first data block forming a blockchain and distributing, by the second service provider, the blockchain to others of the plurality of service providers.

In some embodiments, creating the first data block further includes obtaining validation of the first services from one or more of the plurality of service providers. In some of these embodiments, obtaining validation further includes negotiation between the one or more of the plurality of service providers to obtain a consensus.

In some embodiments, the blockchain is distributed by a network slice dedicated to services associated with the first services.

In some embodiments of the present disclosure, the method further includes providing, by a third service provider, second services for provision of the wireless communication network and creating, by the third service provider, a first data block indicative of the second services for creation of a second blockchain, said second blockchain indicative of the second services. The method further includes distributing, by the second service provider, the second blockchain to others of the plurality of service providers. In some of these embodiments, the blockchain and the second blockchain is distributed by a network slice dedicated to a plurality of services including the first services and the second services. In such embodiments, the blockchain has a first service identifier associated therewith and the second blockchain has a second service identifier associated therewith.

In some embodiments of the present disclosure, the method further includes providing, by a second service provider, second services for provision of the wireless communication network and creating, by the second service provider, a second data block indicative of the second services. The method further includes appending, by the second service provider, the second block to the first data block forming a blockchain and distributing, by the second service provider, the blockchain to others of the plurality of service providers. In some of those embodiments, the blockchain is distributed by a network slice dedicated to a plurality of services including the first services and the second services. In such cases, each block of the blockchain has a service identifier associated therewith for identification of that block.

According to another aspect of the present disclosure, there is provided a method for provision of a wireless communication network by a plurality of service providers. The method includes providing, by a first service provider, first services for provision of the wireless communication network and creating, by the first service provider, a first blockchain indicative of the first services. The method further includes distributing, by the first service provider, the first blockchain to only a first portion of the plurality of service providers.

In some embodiments of the present disclosure, the method further includes providing, by a second service provider, second services for provision of the wireless communication network and creating, by the second service provider, a second blockchain indicative of the second services. The method further includes distributing, by the second service provider, the second blockchain to only a second portion of the plurality of service providers. In some embodiments, the method further includes, before creating the first blockchain, obtaining validation of the first services from a first group selected from the plurality of service providers. In some embodiments, the method further includes, before creating the second blockchain, obtaining validation of the second services from the first group. In some embodiments, the method further includes, before creating the second blockchain, obtaining validation of the second services from a second group selected from the plurality of service providers, where the second group includes at least one service provider which is not included in the first group.

In various embodiments of the present disclosure, services are configuration related services or monitoring and collection of operational data related services or network operation data sharing related services or wireless network operation related services. In various embodiments, a group of service providers and optionally services provided thereby is identified by an identifier. In various embodiments, the service provider is a network function, network entity, apparatus or system configured to communicate instructions associated with at least one of approval, rejection, a request for an approval. In various embodiments, a group of service providers includes multiple service providers, and wherein each of the multiple service providers represents a different party that agrees to negotiate with others of the group of service providers to achieve a consensus before an action associated with at least one service is performed.

According to another aspect of the present disclosure, there is provided a system including a first service provider having a processor and a non-transient memory for storing instructions. The instructions, when executed by the processor cause the service provider to be configured to provide first services for provision of the wireless communication network, create a first data block indicative of the first services and distribute the first data block to others of the plurality of service providers.

As will be readily understood by the description above, the terms base station and network node can be interchangeably used to define an evolved NodeB (eNB), a next generation NodeB (gNB) or other base station or network node configuration.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A system comprising:
a plurality of service providers to mutually provide management or control of a wireless communication network, the plurality of service providers including one or more of infrastructure network providers, slice providers, virtual function providers and equipment providers; each of the plurality of service providers belongs to a consortium, the consortium corresponds to a rule;
the rule indicates how to manage a record of actions performed by each of the plurality of service providers, wherein an action performed by a service provider of the plurality of service providers is associated with a service for the management or control of the wireless communication network that is provided by the service provider; and
the action is performed by the service provider upon a consensus approval from the plurality of service providers, the consensus approval associated with the record;
each of the plurality of service providers is configured to:
create a record indicative of one or more actions associated with a set of services and distribute the record to other of the plurality of service providers in the consortium, wherein the set of services is in one service type selected from a plurality of service types including configuration related services, the configuration related services including one or more of an equipment update and configuration service, an infrastructure network configuration service, a virtual function installation and modification service and a slice instantiation, configuration and modification service;
upon consensus approval by the other of the plurality of service providers associated with the record, perform the one or more actions associated with the set of services for the management or control of the wireless communication network;
manage an update of the record by appending a second record to the record so as to achieve an updated record, the second record and the record are indicative of the one or more actions associated the set of services; and
manage distribution of the updated record to one or more other service providers in the consortium.

2. The system according to claim 1, wherein the plurality of service types further includes network operation data sharing related services, and wireless network operation related services.

3. The system of claim 2, wherein the network operation data sharing services include services relating to provide trustable sharing of operational data collected from the communication network.

4. The system of claim 2, wherein the wireless network operation related services include services relating to one or more of authentication, authorization and accounting (AAA) and charging associated with an end-point identifier (ID) AAA service.

5. The system according to claim 1, wherein the record indicative of one or more actions associated with the set of services includes one or more of: a record indicative of performing one or more service in the set of services, a record indicative of completing one or more service in the set of services, a record indicative of a future action towards one or more service in the set of services, a record indicative of a completed action towards one or more service in the set of services, and a record indicative of an undergoing action towards one or more service in the set of services.

6. The system according to claim 1 wherein each of the plurality of service providers is further configured to:
select a format of the record to be created according to the service type of the particular service associated with the record and create the record according to the selected format.

7. The system of claim 1, wherein each of the plurality of service providers is further configured to: obtain validation of the actions prior to the creation of the record.

8. The system according to claim 7, wherein obtaining validation further includes negotiation with one or more of the plurality of service providers to obtain a consensus.

9. The system of claim 1, wherein the distribution of the record is within a network slice in the communication network, wherein the network slice is dedicated to support one or more of services in the particular set of services.

10. The system of claim 1, wherein different service providers in the consortium provides sets of services in different service types.

11. The system of claim 1, wherein the set of services in a particular service type are provided by different service providers in the consortium.

12. The system of claim 1, wherein management of the record by each of the plurality of service providers is based on a blockchain.

13. The system of claim 1, wherein the plurality of service providers are implemented in one or more of network apparatus and network virtual function.

14. An apparatus including a processor coupled with a memory, wherein one of a plurality of service providers is implemented in the apparatus, the plurality of service providers to mutually provide management or control of a wireless communication network, the plurality of service providers including one or more of: infrastructure network providers, slice providers, virtual function providers and equipment providers; each of the plurality of service providers belongs to a consortium, the consortium corresponds to a rule;
the rule indicates how to manage a record of actions performed by each of the plurality of service providers, wherein an action performed by a service provider of the plurality of service providers is associated with a service for the management or control of the wireless communication network that is provided by the service provider; and
the action is performed by the service provider upon a consensus approval from each of the other of the plurality of service providers, the consensus approval associated with the record; wherein the apparatus is configured to:
create a record indicative of one or more actions associated with a set of services associated with one service provider in the consortium and corresponding to the apparatus, and distribute the record to other of the plurality of service providers in the consortium, wherein the set of services is in one service type selected from a plurality of service types including configuration related services, the configuration related services including one or more of an equipment update and configuration service, an infrastructure network configuration service, a virtual function installation and modification service and a slice instantiation, configuration and modification service;

upon consensus approval by the other of the plurality of service providers associated with the record, perform the one or more actions associated with the set of services for the management or control of the wireless communication network;

manage an update of the record by appending a second record to the record so as to achieve an updated record, the second record and the record are indicative of the one or more actions associated the set of services; and manage distribution of the updated record to one or more other service providers in the consortium.

15. A method for communications between a plurality of service providers in a communication network, the plurality of service providers to mutually provide management or control of a wireless communication network, the plurality of service providers including one or more of: infrastructure network providers, slice providers, virtual function providers and equipment providers; each of the plurality of service providers belongs to a consortium, the consortium corresponds to a rule;

the rule indicates how to manage a record of actions performed by each of the plurality of service providers, wherein an action performed by a service provider of the plurality of service providers is associated with a service for the management or control of the wireless communication network that is provided by the service provider; and the action is performed by the service provider upon a consensus approval from each of the other of the plurality of service providers, the consensus approval associated with the record; the method comprising:

creating a record indicative of one or more actions associated with a set of services and distributing the record to other of the plurality of service providers in the consortium, wherein the set of services is in one service type selected from a plurality of service types including configuration related services, the configuration related services including one or more of an equipment update and configuration service, an infrastructure network configuration service, a virtual function installation and modification service and a slice instantiation, configuration and modification service;

upon consensus approval by the other of the plurality of service providers associated with the record, performing the one of more actions associated with the set of services for the management or control of the wireless communication network;

managing an update of the record by appending a second record to the record so as to achieve an updated record, the second record and the record are indicative of the one or more actions associated the set of services; and managing distribution of the updated record to one or more other service providers in the consortium.

16. The apparatus according to claim 14 wherein the apparatus is further configured to:

select a format of the record to be created according to the service type of the particular service associated with the record and create the record according to the selected format.

17. The method according to claim 15 wherein the method further comprises:

selecting, by each of the plurality of service providers, a format of the record to be created according to the service type of the particular service associated with the record and create the record according to the selected format.

* * * * *